Dec. 20, 1966   J. McINROY   3,292,435
GAS PRESSURE REDUCING DEVICE, MORE ESPECIALLY FOR HYGROMETERS
Filed May 4, 1964   2 Sheets-Sheet 1

INVENTOR
JOHN McINROY

BY Watson, Cole, Grindle & Watson

ATTORNEYS

Dec. 20, 1966  J. McINROY  3,292,435
GAS PRESSURE REDUCING DEVICE, MORE ESPECIALLY FOR HYGROMETERS
Filed May 4, 1964  2 Sheets-Sheet 2

INVENTOR
JOHN McINROY

BY
Watson, Cole, Grindle & Watson
ATTORNEYS 3,292,435
GAS PRESSURE REDUCING DEVICE, MORE
ESPECIALLY FOR HYGROMETERS
John McInroy, Redditch, England, assignor to Hymatic
Engineering Company Limited, Redditch, England, a
company of Great Britain
Filed May 4, 1964, Ser. No. 364,654
Claims priority, application Great Britain, May 3, 1963,
17,638/63
6 Claims. (Cl. 73—335)

This invention relates to gas pressure reducing devices for effecting substantially isothermal expansion of gas from a high pressure for example of the order of 5000 lb./sq. in.

According to the present invention such a device includes a passage whose length is many times its transverse dimensions and is constructed and arranged to supply heat to the gas to make up for its cooling due to expansion.

The invention may be employed for various applications in which it is required to effect substantially isothermal expansion of a gas from a high pressure. One specific application is to a hygrometer for testing the moisture content of gases. Thus one from the present invention is an improvement in or modification of that described in the present applicant's U.S. Patent No. 3,041,878.

According to this form of the invention a hygrometer device comprises an observation chamber having exhausting means for allowing gas under pressure to escape from it substantially adiabatically, and means for illuminating it to enable mist thereby formed to be detected, and means for charging the chamber from a high pressure supply including a passage whose length is many times its transverse dimensions for supplying heat to the gas as it expands when flowing from the supply to the chamber.

The passage, the length of which may for example, be at least a thousand times its transverse dimension, is conveniently afforded by a capillary tube wound into a coil. In one arrangement the capillary tube is in the form of a coiled coil comprising a helical coil which is itself wound into a helical coil. Preferably the capillary tube is wound on a comparatively stout metal former.

In the arrangement described in the prior specification referred to, expansion of the gas passing from the high pressure source to the observation chamber was effected substantially isothermally (to avoid depositing moisture or frost before reaching the observation chamber) by a multi-stage restrictor valve comprising a plurality of needle valves. The arrangement in accordance with the present invention, employing a passage whose length is many times its transverse dimensions, for example a coil of capillary tube, has been found to be equally effective and considerably simpler.

The invention may be performed in various ways but certain specific embodiments will be described by way of example with reference to the accompanying drawings, in which.

Figure 1:
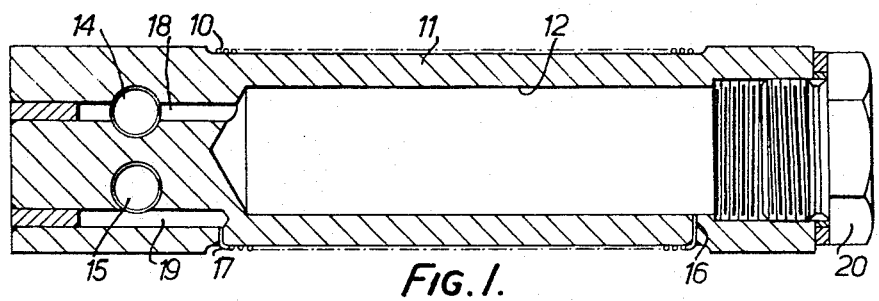
FIGURES 1 and 2 are longitudinal sections respectively of two forms of gas pressure reducing device.

In the embodiment shown in FIGURE 1 a gas pressure reducing device comprises a helical coil 10 of capillary tube wound on a thick-walled hollow cylindrical former 11 which also affords connections between the tube and the other parts of the apparatus. In the specific embodiment the former is about 6" long and 1½" diameter and on its outer surface it carries a helical winding consisting of eighty turns of capillary tube having an outside diameter .022" and an inside diameter .010".

Thus the length of tube is about 380" whereas its internal diameter is only ten thousandths of an inch so that the ratio of length to diameter is of the order of 38,000:1. The tube and former may be of any suitable metal, for example brass.

The former has in it a large central bore 12 extending from one end to within an inch or two of the other end and near the latter end a pair of transverse bores 14 and 15 forming an inlet and an outlet for connection to external parts. The ends of the capillary tube are brazed into small radial holes 16, 17 through the wall of the former, the hole 16 opening into one end of the large central bore whose other end is connected by a small longitudinal bore 18 to one of the transverse bores 14, whilst the other radial hole 17 is connected to a second longitudinal bore 19 opening into the other transverse bore 15. The open end of the former 11 is closed by a screwed plug 20.

The turns of the helical coil are uniformly spaced, and may, if desired, be soldered or otherwise bonded to the former to improve heat transmission.

The construction described is suitable for intermittent or short-period operation but with continuous operation the temperature of the heavy former tends to fall gradually.

Figure 2:
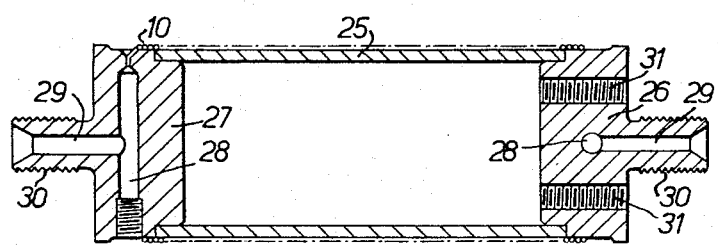

In the construction shown in FIGURE 2 the former comprises a hollow cylinder or tube 25 with plugs 26 and 27 in the ends which afford connection to the ends of the capillary tube by means of transverse passages 28 and longitudinal passages 29 extending into threaded bosses 30 to which pipes can be secured, for example by union nuts. The plugs 26 and 27 may have in them holes either for circulation of atmospheric air by natural convection or for forced circulation of warm air. In the drawings the plug 26 is shown with two holes 31. The inner wall of the tubular former may be provided with longitudinal fins (not shown) to improve heat transfer from the air.

Figure 3:
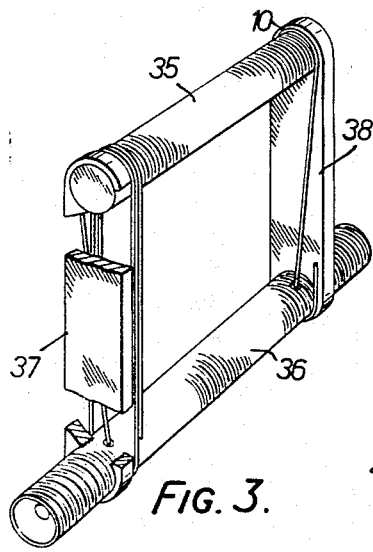
FIGURES 3 and 4 are perspective views of a third form and a fourth form of such devices.

In a further arrangement, shown in FIGURE 3, the capillary tube 10 is wound round a pair of parallel guide tubes 35 and 36 which may if desired be screw-threaded in order to locate the capillary tube. The two guide tubes are connected together by a pair of spacer bars 37 and 38 which may have in them screw-threaded holes in which the guide tubes are screwed. The guide tube 36 is plugged in the middle and the ends of the capillary tube are secured in holes in it so as to provide connections to the capillary tube.

Figure 4:
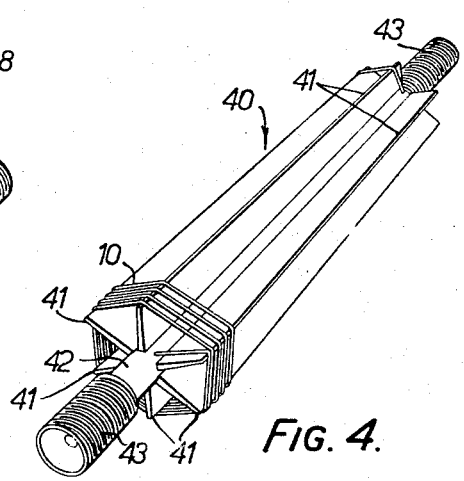

In a further construction, shown in FIGURE 4, the capillary tube 10 is wound on an extruded former 40 having six longitudinal fins 41 projecting from a central pipe 42, the ends of which may provide screwed connections 43 communicating with the ends of the capillary tube. The capillary tube may be soldered to the fins so as to improve heat transfer.

In each arrangement the capillary tube may iself be provided with fins, either longitudinal, helical or circumferential, in order to improve the direct heat transfer from it to the surrounding air.

Figure 5:
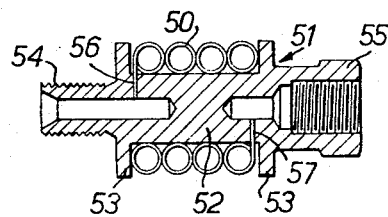
FIGURE 5 is a longitudinal section of a fifth form of device.

FIGURE 5 shows a further construction employing a capillary tube 50 in the form of a coiled coil thereby providing a very compact arrangement. Thus the capillary tube is initially wound into a long helical coil and this helical coil is then itself wound into a helical coil on a former 51 comprising a cylindrical body 52 having a pair of flanges 53, and at its ends male and female threaded connections 54 and 55. The ends of the capillary tube are soldered in small radial holes 56 and 57 which comunicate with the threaded connections. Again the capillary tube may if desired be soldered to the former but the arrangement is intended to expose a large area of the capillary tube itself to the surrounding air for heat transfer from it.

It will be appreciated that the constructions shown in FIGURES 2 to 5, and especially that of FIGURE 5, may be regarded as modular units which can be connected together to form various assemblies. In particular if the requirements demand a capillary tube having a greater length than that provided by the unit of FIGURE 5 it is a simple matter to connect two or more such units in series.

The gas pressure reducing devices described with reference to FIGURES 1 to 5 may find various applications but one specific application is to a hygrometer of dew point type. This may be as described in the specification referred to above and whilst it is thought unnecessary to describe it in detail herein it will be briefly described with reference to FIGURE 6.

Figure 6:
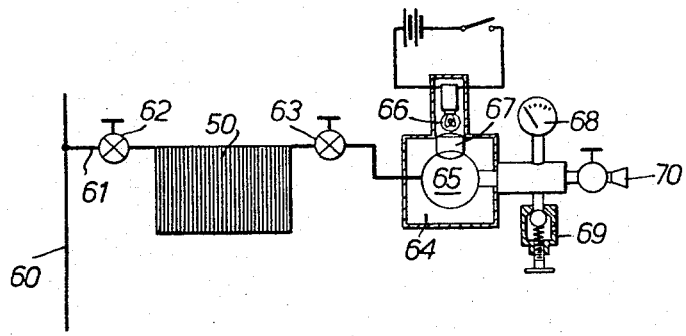
FIGURE 6 is a diagram showing the application of such a device to a hygrometer for testing the moisture content of gases.

Thus as shown in FIGURE 6 a supply pipe 60 for the gas to be tested is provided with a branch 61 through which a sample may be tapped off through a stop valve 62, the capillary tube 50 (or 10 in the case of FIGURES 1 to 4) and a further stop valve 63 to an observation chamber 64 of the testing device. This has in it a cylindrical cavity closed by an observation window 65 and illuminated by a lamp 66 through a lens 67 producing a parallel beam of light. The cavity is connected to a pressure gauge 68, a manually adjustable pressure relief valve 69 and an exhaust valve 70.

In operation a number of tests are made at successively increasing pressures until a pressure value is reached at which a cloud or fog is observed in the chamber when the gas is released through the exhaust valve. The dew point, and moisture content, can then be read off from a table or graph of corresponding values.

Thus the operator sets the pressure relief valve 69 to an initial relatively low pressure and opens the stop valves 62 and 63 to allow gas to flow from the supply through the branch 61 and to expand through the capillary tube 50 into the observation chamber 65 until the pressure in the latter builds up to the predetermined value at which gas begins to escape from the pressure relief valve 69, this value being noted on the pressure gauge 68. The stop valves 62 and 63 are then closed and the exhaust valve 70 is opened. Assuming no fog or cloud is observed the pressure relief valve 69 is then adjusted to a somewhat higher pressure and the test is repeated. This continues until fog or cloud is observed, the pressure then being noted as already referred to.

The heat transfer from the capillary tube to the gas expanding through it compensates for the cooling due to expansion sufficiently to ensure that no moisture is deposited before the gas is allowed to escape from the observation chamber.

The pressure reducing device is considerably simpler than that described in the prior specification referred to, but the operation is similar, and the details or modifications of the apparatus may be otherwise as described therein.

What I claim as my invention and desire to secure by Letters Patent is:

1. A hygrometer device comprising an observation chamber having exhausting means for allowing gas under pressure to escape from it substantially adiabatically, and means for illuminating it to enable mist thereby formed to be detected, and means for charging the chamber from a high pressure supply including a capillary tube having a length many times its transverse dimension and which is wound into a coil, for supplying heat to the gas as it expands when flowing from the supply to the chamber.

2. A hygrometer device as claimed in claim 1 in which the length of the capillary tube is at least a thousand times its transverse dimension.

3. A hygrometer device as claimed in claim 1 in which the capillary tube is in the form of a coiled coil comprising a helical coil which is itself wound into a helical coil.

4. A hygrometer device as claimed in claim 1 in which the capillary tube is wound round a pair of parallel guide members, connected by spacing means.

5. A hygrometer device as claimed in claim 1 in which the capillary tube is wound on a former comprising an elongated member affording a number of longitudinal projecting fins.

6. A hygrometer device as claimed in claim 1 in which the capillary tube is wound on a comparatively stout metal former.

References Cited by the Examiner

UNITED STATES PATENTS

| | | | |
|---|---|---|---|
| 2,163,730 | 5/1939 | Goetzl | 73—211 |
| 2,199,631 | 5/1940 | Karmazin | 138—44 |
| 3,041,878 | 7/1962 | McInroy | 73—335 |
| 3,071,001 | 1/1963 | Goldsmith | 73—211 |
| 3,137,161 | 6/1964 | Lewis et al. | 73—55 |

DAVID SCHONBERG, *Primary Examiner.*

LOUIS R. PRINCE, *Examiner.*

MICHAEL B. HEPPS, *Assistant Examiner.*